United States Patent Office

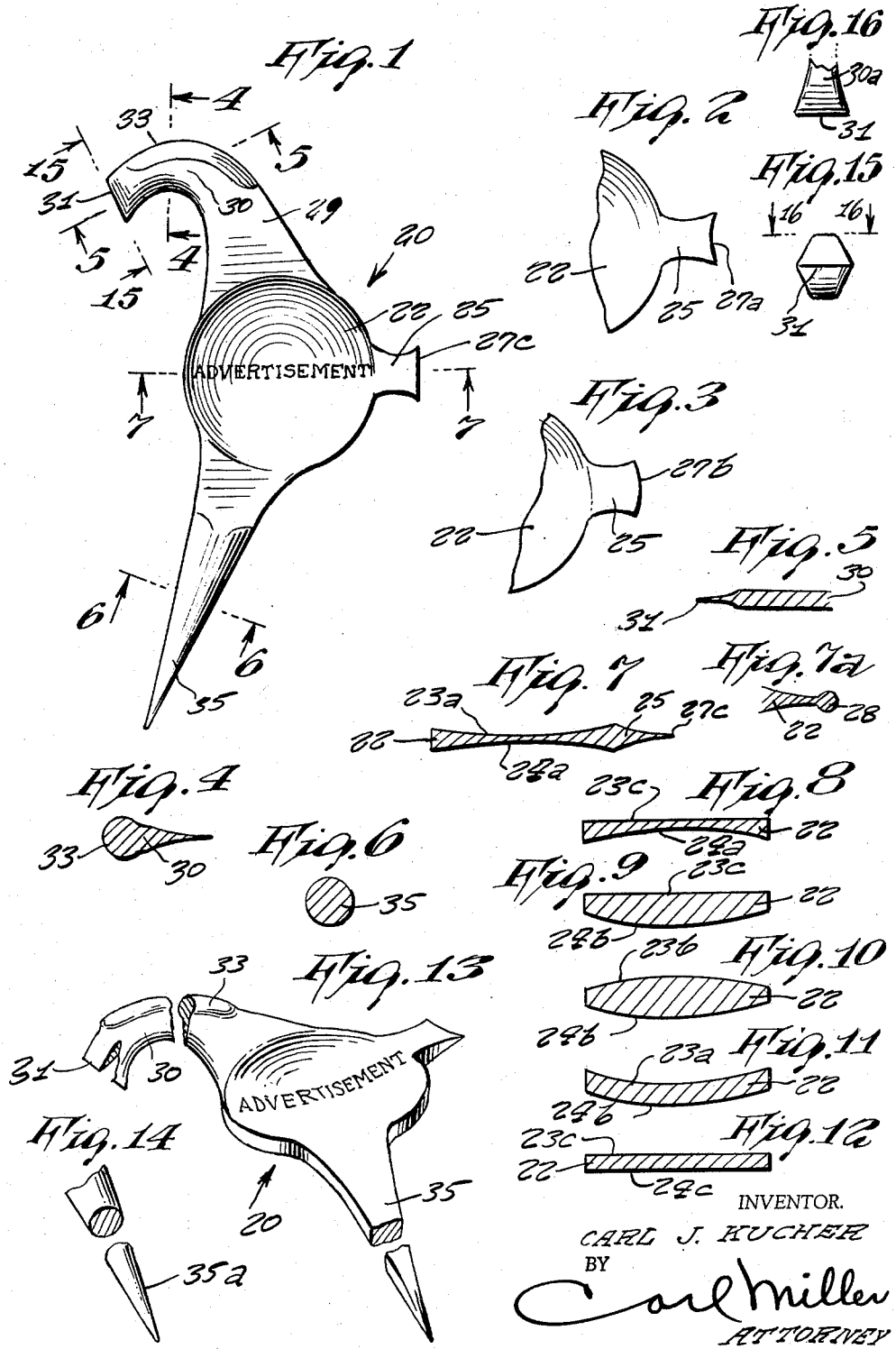

2,925,087
Patented Feb. 16, 1960

2,925,087

COMBINED TOOTHPICK AND GUM MASSAGER

Carl J. Kucher, Richmond Hill, N.Y.

Application October 8, 1957, Serial No. 688,931

2 Claims. (Cl. 132—93)

This invention relates to dental appliances and, more particularly, to a device for removing food particles and other foreign matter from between teeth and for massaging the gums.

While various types of toothpicks, floss, and other cleaning devices have been provided for removing foreign matter from between the teeth, many have proven to be harmful to the teeth and difficult to use.

Accordingly, an object of the present invention is to provide a dental appliance for removing foreign matter from between the teeth and for massaging the gums that is simple in construction, efficient in operation, and which will overcome the aforementioned difficuties.

Another object of the present invention is to provide a disposable dental appliance for cleaning teeth in the aforementioned manner which has a substantially large main body portion which can be effectively used for advertising purposes.

All of the foregoing and still further objects and advantages of this invention will become apparent from a study of the following specification, taken in connection with the accompanying drawing, wherein:

Figure 1 is a front plan view of a dental applicance made in accordance with the present invention;

Figures 2 and 3 are plan views of modified forms of a portion of the toothpick shown in Figure 1;

Figures 4, 5, 6, and 7 are transverse cross sectional view taken along lines 4—4, 5—5, 6—6, and 7—7, respectively of Figure 1;

Figure 7a is a transverse cross sectional view similar to Figure 7 showing a modified form of construction;

Figures 8, 9, 10, 11, and 12, are views smilar to the cross sectional view of Figure 7, showing a still further modified form of construction;

Figure 13 is a perspective view of the toothpick shown in Figure 1, with parts broken away to shown the cross sectional configuration of certain parts thereof;

Figure 14 is a fragmentary perspective view of a further modified form of construction;

Figure 15 is a view taken along line 15—15 of Figure 1; and

Figure 16 is a top plan view taken along line 16—16 of Figure 15, of a still further modified form of construction.

Referring now to the drawing, and more particularly to Figure 1 thereof, a dental appliance 20 made in accordance with one form of the present invention is shown to include a main body portion 22 having a short extension 25 protruding radially outwardly from the edge thereof. A hook shaped extension 29 protrudes radially outwardly from a circumferentially spaced apart location on the edge of the main body portion from the short extension 25. Finally, a pointed extension 35 protrudes radially outwardly from the edge of the main body portion intermediate the short extension 25 and the hook shaped extension 29.

As is clearly shown in Figure 1 of the drawing, the main body portion 22 has substantially circular upper and lower surfaces which may be used for advertising matter to enable these appliances to be used for promotional purposes. As is shown in Figure 7 of the drawing, the device 20 made in accordance with one form of the present invention is provided with a concave upper surface 23a and a concave lower surface 24a. However, as is shown in Figures 8 through 12, the main body portion 22 can be defined by selective concave, convex, and flat upper surfaces 23a, b, c and concave convex, and flat lower surfaces 24a, b, c respectively, so as to provide provide any desired cross sectional shape.

In a similar manner, the outer edge of the short extension 25 can be of concave, convex, or flat shape 27a, b, c, respectively, in order to suit the particular purposes required. This edge of the short extension 25 is particularly suited for removing particles of food and foreign matter from between or about the incisor, canine, and premolar upper and lower teeth. The outer edge 31 of the hook shaped extension 29 which is disposed at the end of the arcuate shank 30 is particularly suited for removing food and foreign matter from between or about the upper and lower inside portions of all of the teeth, while the convex bulbous member 33 is effectively used for massaging the gums to stimulate circulation. As is shown in Figure 16, the sides of the shank 30a made in accordance with a modified form of construction are outwardly diverging toward the edge 31 so as to provide a more convenient shape for certain types of teeth. In Figure 14 of the drawing, the point extension 35a is shown to be of substantially circular cross section as compared to the rectangular cross section of the point extension 35 of the device shown in Figures 1 and 13. It will thus be recognized that each of the particular elements of the present invention can be made of any desired cross sectional configuration, and can be constructed of any desirable material, such as plastic, precious metal, rubber, or other synthetic or paper product. In the same respect, substantially any color or color combination can be used to add to the attractiveness of the device so as to further enhance the use of this invention for advertising and promotional purposes.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. A combined tooth pick and gum massager comprising, in combination, a main body portion, a short extension protruding radially outwardly from one edge of said main body portion, a hooklike extension protruding directly radially outwardly from the edge of said main body portion circumferentially spaced from said short extension, a point extension protruding directly radially outwardly from the edge of said main body portion intermediate said short extension and said hook extension, said short extension including an outwardly facing thin edge for removing particles of food and foreign matter from between or around the incisor, canine, and premolar upper and lower teeth, said hook extension including an outwardly facing thin edge for removing food and foreign matter from between or around the upper and lower inside portions of all of the upper teeth, and said point extension comprising a fine pick for removing food particles and foreign matter from between and around the upper and lower molars.

2. A combination toothpick and gum massager as set forth in claim 1, wherein said hook extension further comprises an arcuate bulbous element for massaging the gums.

References Cited in the file of this patent

UNITED STATES PATENTS

| | | |
|---|---|---|
| 1,451,380 | Thum | Apr. 10, 1923 |
| 1,581,501 | Wright | Apr. 20, 1926 |
| 1,624,054 | Kuhne | Apr. 12, 1927 |